United States Patent
Goto et al.

[11] Patent Number: 5,835,235
[45] Date of Patent: Nov. 10, 1998

[54] IMAGE FORMING APPARATUS WHICH ESTABLISHES IMAGE FORMATION VALUES USING ENVIRONMENTALLY SENSITIVE REFERENCES

[75] Inventors: Hiroshi Goto, Itami; Satoshi Deishi, Ibaraki; Peter Johnston, Toyokawa, all of Japan

[73] Assignee: Minolta Co., Ltd., Osaka, Japan

[21] Appl. No.: 534,252

[22] Filed: Sep. 26, 1995

[30] Foreign Application Priority Data

Sep. 26, 1995 [JP] Japan ................................. 6-229911

[51] Int. Cl.$^6$ ........................................... H04N 1/407
[52] U.S. Cl. ..................... 358/406; 358/298; 358/504; 347/189
[58] Field of Search ........................ 358/406, 296, 358/298, 300, 401, 501, 504; 347/133, 189, 131, 188, 190, 191; 399/44, 38, 74, 177

[56] References Cited

U.S. PATENT DOCUMENTS

| | | | |
|---|---|---|---|
| 4,786,924 | 11/1988 | Folkins | 355/3 DD |
| 4,982,232 | 1/1991 | Naito | 355/208 |
| 4,999,673 | 3/1991 | Bares | 355/208 |
| 5,148,289 | 9/1992 | Nishiyama et al. | 358/300 |
| 5,311,256 | 5/1994 | Hamamichi et al. | 355/208 |
| 5,313,308 | 5/1994 | Hasegawa et al. | 358/406 |
| 5,404,203 | 4/1995 | Kinoshita et al. | 355/208 |
| 5,453,773 | 9/1995 | Hattori et al. | 347/129 |
| 5,473,415 | 12/1995 | Hayashi et al. | 355/208 |
| 5,574,543 | 11/1996 | Sakai et al. | 399/59 |
| 5,583,644 | 12/1996 | Saranuma et al. | 358/296 |

*Primary Examiner*—Peter S. Wong
*Assistant Examiner*—Derek J. Jardieu
*Attorney, Agent, or Firm*—Sidley & Austin

[57] ABSTRACT

Disclosed is an image forming apparatus which reproduces halftone by using variable area toning method. The image forming apparatus stores a reference pattern data for adjusting bias voltage of developing device. The image forming apparatus also stores density toning data used for printout. An image of the reference pattern data has a dot pattern of which the optical density is more sensitive to environmental fluctuation than that of density toning data.

21 Claims, 10 Drawing Sheets

IMAGE FORMING APPARATUS WHICH ESTABLISHES IMAGE FORMATION VALUES USING ENVIRONMENTALLY SENSITIVE REFERENCES

BACKGROUND OF THE INVENTION

1. Field of the Invention

The present invention relates to an image forming apparatus.

2. Description of the Related Art

Figure 1:
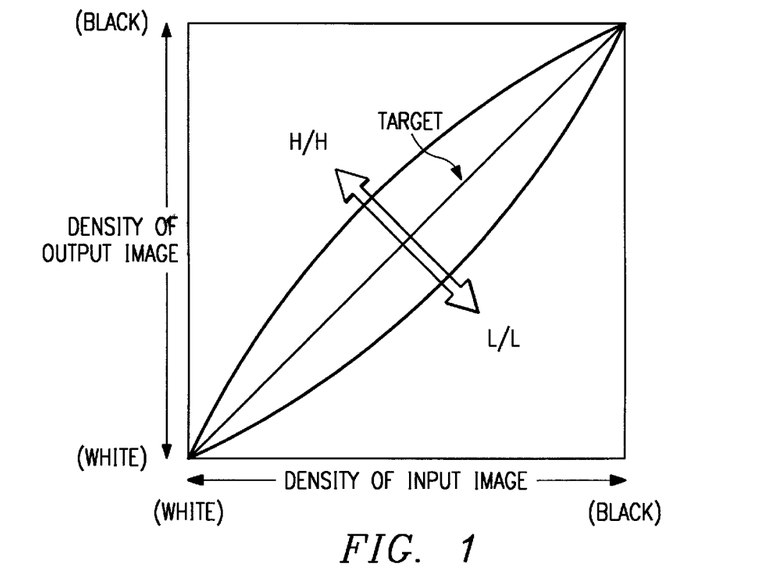
FIG. 1 illustrates the effect on output image density by environmental fluctuation in an image forming apparatus producing halftones using the variable area toner method.

Heretofore, a known method accomplishes halftone reproduction by having a single pixel correspond to a plurality of dots and changing the number of dots reproduced in black within a single pixel. This method uses the change in the area of the black part within a single pixel by the number of reproduced dots to express halftones by the change of said area, and thus is called the variable area toning method. In image forming apparatus of the electrophotographic type using the variable area toning method, halftone characteristics change in accordance with fluctuation of the operating environment of the apparatus, e.g., fluctuations between high temperature and high humidity (H/H) and low temperature and low humidity (L/L), and said changes produce changes in image density of the output toner images. FIG. 1 shows the changes in halftone characteristics caused by fluctuation of environmental conditions. In the drawing, the horizontal axis represents the density of the input image, and the vertical axis represents the density of the output toner image. In general, the image forming apparatus can be adjusted to make the input image density and the output image density directly proportional, but halftone characteristics change, as shown in the drawing, when the environmental conditions of the image forming apparatus change. This change in halftone characteristics is believed to be due to a change in the amount of toner that adheres to the photosensitive member due to environmental fluctuations.

SUMMARY OF THE INVENTION

An object of the present invention is to eliminate the previously described disadvantages by providing an image forming apparatus capable of normally reproducing images of uniform accuracy regardless of environmental fluctuations.

Another object of the present invention is to provide an image forming apparatus capable of precise adjustment of said image forming apparatus in accordance with environmental fluctuations.

In the preferred embodiments of the present invention, image formation based on a reference pattern is accomplished. Detection of the density of the reference pattern is executed, and then, the image forming apparatus is adjusted based on the results of the detection. The reference pattern has an arrangement of a plurality of dots within a predetermined range, and the arrangement of said dots can be set so as to be sensitive to environmental fluctuation. On the other hand, a plurality of dot patterns, each of which is corresponds to one pixel, may be prepared to correspond to a plurality of halftone levels each of which is represented by image data. When printing based on image data, recording is accomplished based on dot patterns each of which forms a pixel in accordance with the halftone levels represented by the image data. Dot patterns insensitive to environmental fluctuations may be used as the aforesaid dot patterns.

In the Specifications of the present invention, the "environment" of the image forming apparatus is defined as the surroundings and interior of the image forming apparatus. Furthermore,—"environmental fluctuation" is defined as changes in humidity and changes in temperature in the environment in which the image forming apparatus is operated.

In the Specifications of the present invention, "pattern sensitive to environmental fluctuation" or "arrangement of dots sensitive to environmental fluctuation" is defined as a pattern which readily produces changes in the optical density of an output image when the operating environment of the image forming apparatus changes. Conversely, "pattern insensitive to environmental fluctuation" or "arrangement of dots insensitive to environmental fluctuation" is defined as a pattern which does not changes the optical density of a reproduced output image.

In the Specifications of the present invention, "pattern of small distribution" or—"arrangement of dots of small distribution" is defined as a pattern that reproduces dots at relatively tight positions. Conversely, "pattern of large distribution" or "arrangement of dots of large distribution" is defined as a pattern that reproduces dots at relatively dispersed positions.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

FIRST EMBODIMENT

General Construction

Figure 2:
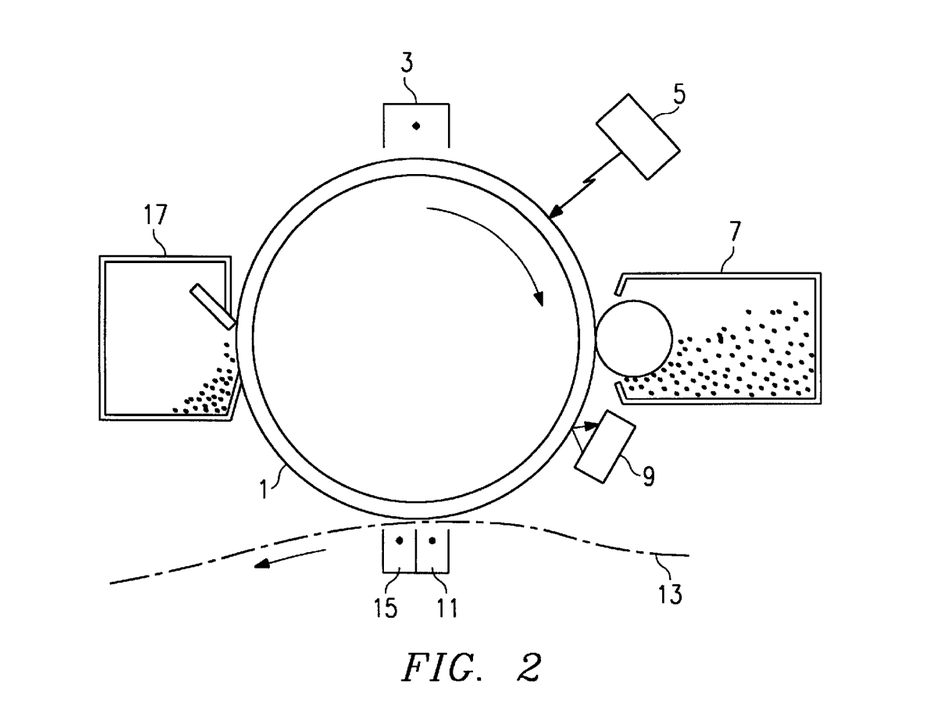
FIG. 2 briefly shows the construction of the essential part of a first embodiment of the image forming apparatus of the present invention.

FIG. 2 shows the construction of essential portion of an image forming apparatus of the present invention. Photosensitive member 1 is rotatably provided for rotation in a clockwise direction in the image forming apparatus. Photosensitive member 1 is a drum, where on the outer surface of which photoconductive layer is formed. Photosensitive member 1 is not limited to a drum shape, and alternatively may be, for example, an endless belt. Arranged around the periphery of photosensitive member 1, from the upstream side in the direction of rotation, are charger 3, laser light source 5, developing device 7, optical density sensor 9, transfer charger 11, separation charger 15, and cleaner 17. Charger 3 electrically charges the outer surface of photosensitive member 1 to a predetermined potential. Laser light source 5 exposes the surface of photosensitive member 1 in accordance with an input image, so as to form an electrostatic latent image on the outer surface of photosensitive member 1. Developing device 7 accommodates powder toner material charged to a predetermined polarity, so as to develop the latent image formed on the surface of photosensitive member 1 by means of said powder toner. Developing bias $V_B$ is applied between developing device 7 and photosensitive member 1. Optical density sensor 9 optically detects the toner image density of a reference pattern (described later) formed on the surface of photosensitive member 1. Optical density sensor 9 is provided at a central position relative to the length direction of photosensitive member 1. It is to be noted that common sensors may be used as optical density sensor 9. Transfer charger 11 transfers the toner image on the surface of photosensitive member 1 to paper sheet 13 transported through a sheet transport path. Separation charger 15 separates sheet 13, which bears the transferred toner image, from photosensitive member 1. Cleaner 17 removes residual toner remaining on the surface of photosensitive member 1 after the aforesaid transfer. Sheet 13, which bears the transferred toner image, is transported to a fixing device not shown in the drawing, whereupon the toner image is fixed to said sheet 13, and thereafter sheet 13 is ejected outside the apparatus.

Control Section

Figure 3:
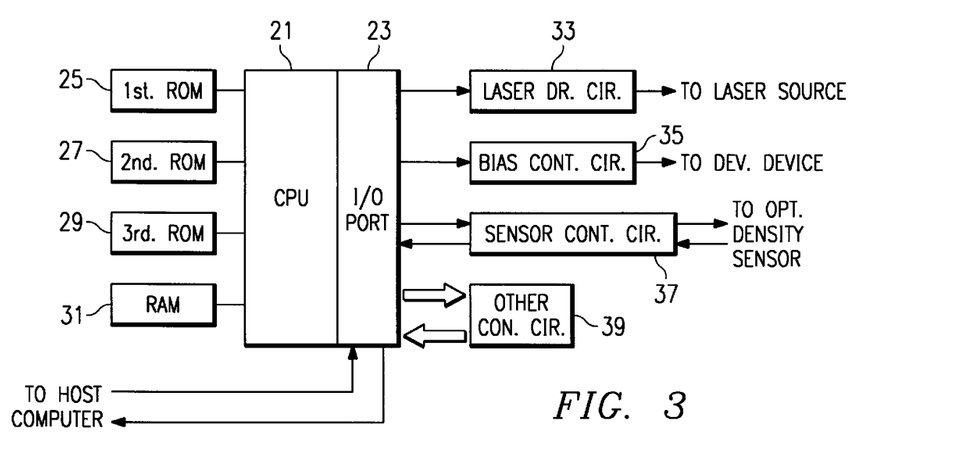
FIG. 3 is a block diagram showing the construction of the control section of the first embodiment of the image forming apparatus of the invention.

FIG. 3 is a block diagram showing the construction of the control section of the first embodiment of the image forming apparatus of the present invention. The control section comprises central processing unit (CPU) 21 provided with input/output port 23. CPU 21 is connected to first read only memory (ROM) 25, second ROM 27, third ROM 29, and random access memory (RAM) 31. First ROM 25 stores programs for sequence control of the image forming apparatus. Second ROM 27 stores density toning data used for printout. The image forming apparatus of the present embodiment reproduces halftones in every one pixel using the variable area toning method, wherein a single pixel corresponds to a plurality of dots. Density toning data include a plurality of dot patterns corresponding to a plurality of halftone levels to be reproduced. Each dot pattern corresponds to one pixel, and includes one or a plurality of dots which are reproduced as black in the single pixel. Density toning data expressing complete whiteness do not include dots to be reproduced as black. Third ROM 29 stores reference pattern data for developing bias regulation and a reference table for developing bias regulation. Reference table stores data of adjusting values of developing bias $V_B$ based on the difference between the density data of the reference pattern output from the optical density sensor 9 and reference density data. RAM 13 temporarily stores various data.

Input/output port 23 of CPU 21 is connected to laser drive circuit 33 for driving the laser light source 5, bias control circuit 35 for regulating developing bias $V_B$ of the developing device and the like, density sensor control circuit 37 for controlling the detection operation of the optical density sensor 9, and other control circuit 39 for controlling the drive motor of photosensitive member 1 and other drive units and sensors and the like. CPU 21 receives information from a host computer via input/output port 23, and outputs information to said host computer. The information received from the host computer includes image data to be printed, and control data such as print commands.

In the image forming apparatus of the aforesaid construction, the following processing is executed with priority over an actual printing operation so as to correct for fluctuations in density of the print image caused by changes in the operating environment of the apparatus.

First, the reference pattern data for developing bias regulation stored in third ROM 29 is read out. An electrostatic latent image corresponding to said reference pattern data is formed on the surface of photosensitive member 1 by laser light source 5, and said latent image is developed as a toner image by developing device 7. The density of the formed toner image is detected by optical density sensor 9, and the developing bias value is adjusted based on said measured value.

Figure 4A:
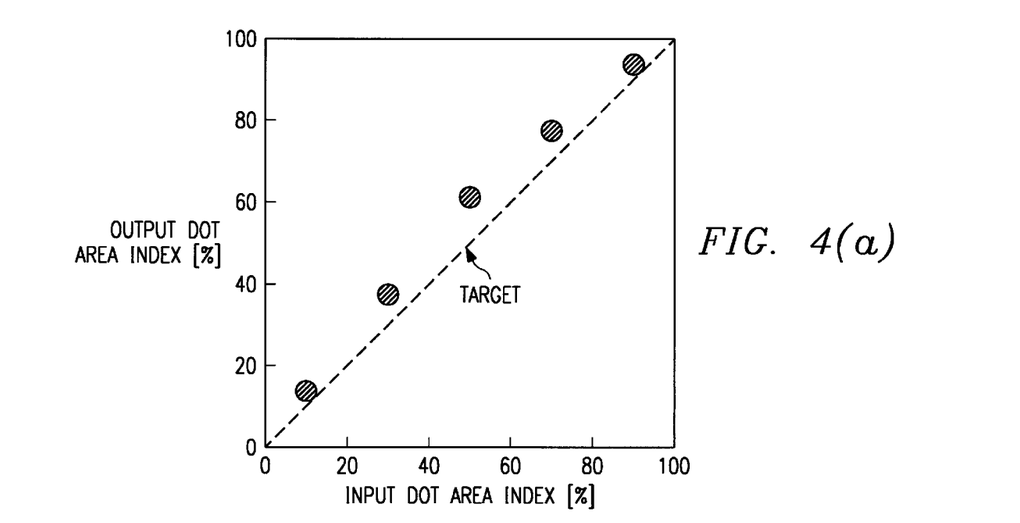
FIG. 4(a) shows the relationship between the input dot area index and output dot area index when the developing bias is not regulated.
Figure 4B:
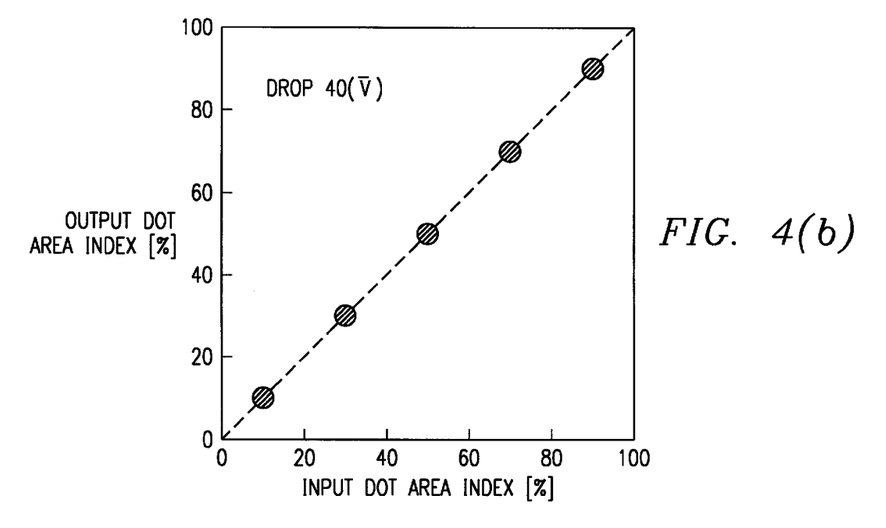
FIG. 4(b) shows the relationship between the input dot area index and output dot area index when the developing bias is regulated.

FIGS. 4(a) and 4(b) show density regulation of output image by adjusting the developing bias value. In both drawings, the horizontal axis represents the input dot area index, and the vertical axis represents the output dot area index. The input dot area index is the ratio (percentage) of the number of dots corresponding to one pixel, and the number of dots reproduced as black within the pixel. For example, when half the number of the dots corresponding to one pixel are reproduced as black, the input dot area index is 50%. On the other hand, the output dot area index corresponds to the difference between a standard amount of received light and the amount of light actually received when optically detecting an image reproduced on a photosensitive member as a toner image; the output dot area index is 100% when a completely black image is detected, and 0% when a completely white image is detected.

FIG. 4(a) shows the condition of the developing bias value before correction; the output dot area index is elevated relative to the input dot area index. That is, the density of the output image reproduced as a toner image is greater than a desired density. When the developing bias value drops 40 V, for example, the desired relationship is obtained between the input dot area index and the output dot area index, i.e., a directly proportional relationship is obtained, as shown in FIG. 4(b).

In the present embodiment, a pattern sensitive to environmental fluctuation is used as the pattern for developing bias regulation to achieve greater accuracy in density regulation. The reference pattern sensitive to environmental fluctuation is described below.

Figure 5A:
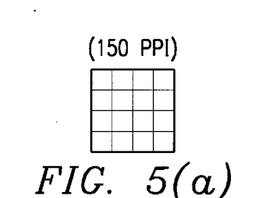
FIGS. 5(a), 5(b), 5(c), and 5(d) show pixels of different sizes.
Figure 5B:
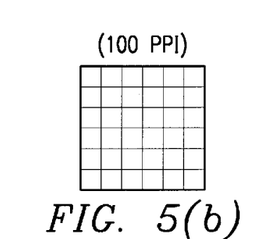
Figure 5C:
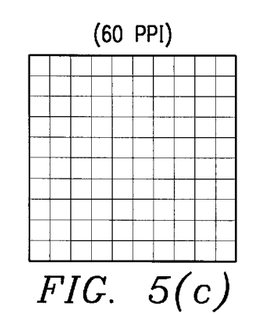
Figure 5D:
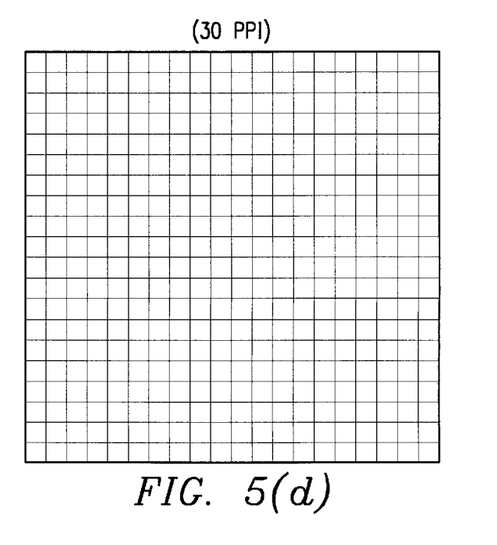

FIGS. 5(a)–5(d) show different pixel units in a printer capable of 600 dpi (dots per inch) resolution. FIG. 5(a) shows a pattern of four dots by four dots (4×4) as one pixel, the pixel density is equivalent to 150 ppi (pixels per inch), and the number of halftones (including the tones of complete black and complete white) is 17. FIG. 5(b) shows a pattern of six dots by six dots (6×6) as one pixel, the pixel density is equivalent to 100 ppi, and the number of halftones is 37. FIG. 5(c) shows a pattern of 10 dots by 10 dots (10×10) as one pixel, the pixel density is 60 ppi, and the number of halftones is 101. FIG. 5(d) shows a pattern of 20 dots by 20 dots (20×20) as one pixel, pixel density is equivalent to 30 ppi, and the number of halftones is 401.

FIGS. 6(a)–6(d) correspond to FIGS. 5(a)–5(d), respectively, and show pixels wherein the input dot area index is 50% in a simple pattern. When density detection is executed, pattern is repeated across a predetermined area.

Figure 6A:
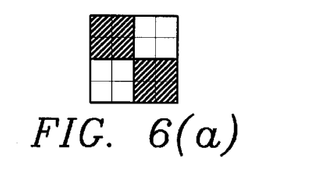
FIGS. 6(a), 6(b), 6(c), and 6(d) correspond to FIGS. 5(a), 5(b), 5(c), and 5(d), respectively, and show pixels having an input dot area index of 50%.
Figure 6B:
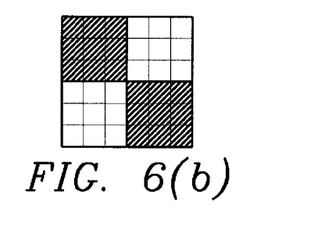

FIGS. 7(a)–7(d) correspond to FIGS. 6(a)–6(d), respectively, and show the effect of environmental fluctuation on the density of an output image via the aforesaid patterns of FIGS. 6(a)–6(b). In FIGS. 7(a)–7(d), the horizontal axis represents the target output dot area index, and the vertical axis represents the shift from the target position by the output dot area index when the environmental conditions change from high humidity and high temperature (H/H) to low humidity and low temperature (L/L). It can be understood from the results that the effect of environmental fluctuation is readily received in the sequence (a), (b), (c), (d) in FIGS. 6(a)–6(b), i.e., the sequence of sensitivity to environmental fluctuation. It can also be understood from the drawings that densities which easily undergo change in an environment have area indices in the range of 40–70%.

The various patterns of FIGS. 6(a)–6(d) are repeated across identical areas, respectively, and the dot arrangements reproduced as black in the formed image are compared. The pattern of FIG. 6(a) comprises repeated black regions of (2×2) dots across from white sections of (2×2) dots. Similarly, the patterns of FIGS. 6(b), 6(c), and 6(d) comprise black sections of (3×3) dots, (5×5) dots, and (10×10) dots across from white sections of (3×3) dots, (5×5) dots, and (10×10) dots, respectively. Accordingly, the pattern having the smallest spacing of black sections is that shown in FIG. 6(a), with the spacing between black sections becoming sequentially larger in the pattern order of 6(b), 6(c), and 6(d).

Figure 6C:
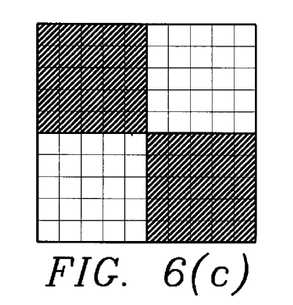
Figure 6D:
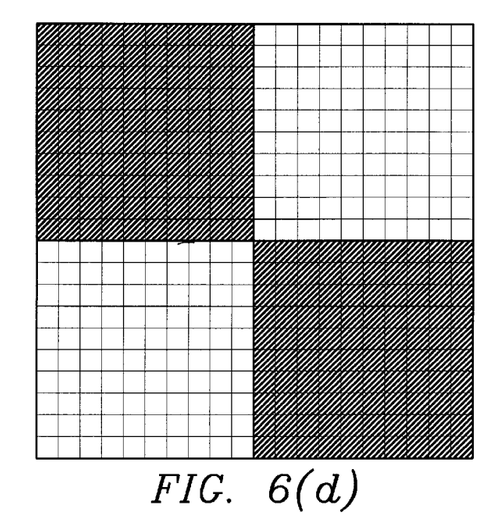
Figure 7A:
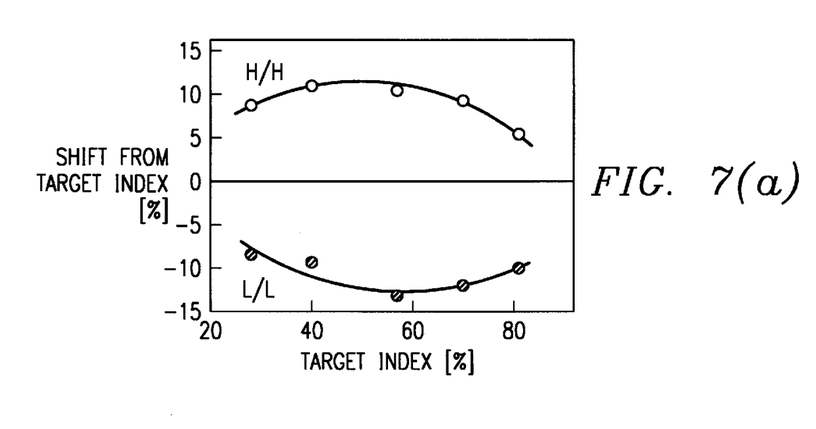
FIGS. 7(a), 7(b), 7(c), and 7(d) correspond to the patterns of FIGS. 6(a), 6(b), 6(c), and 6(d), respectively, and show the effect of environmental fluctuation on output image density.
Figure 7B:
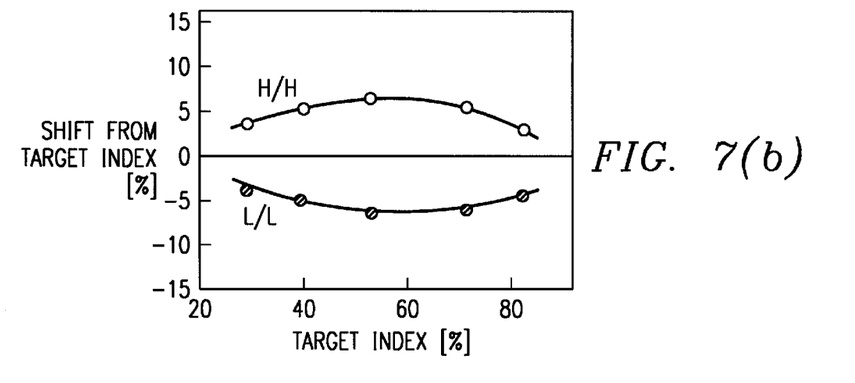
Figure 7C:
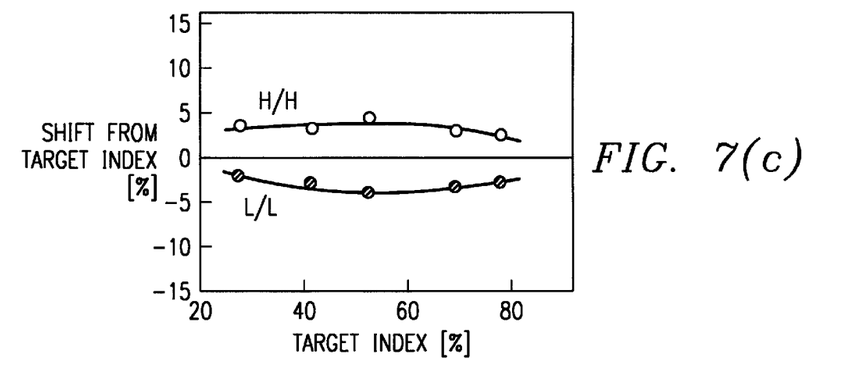
Figure 7D:
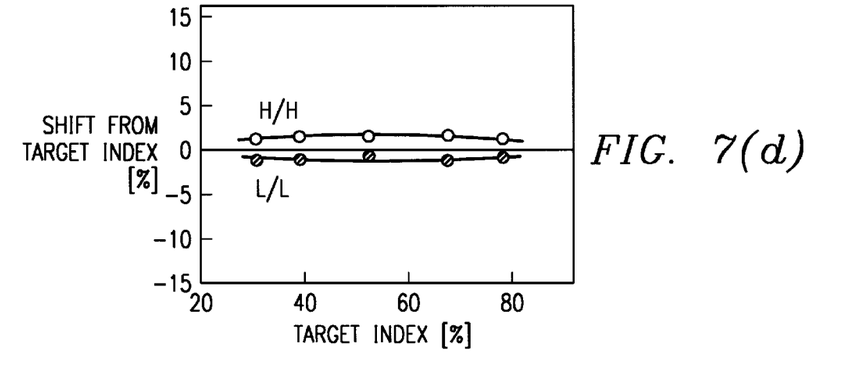

Viewed macroscopically, dots reproduced as black form the pattern of FIG. 6(a) at the most dispersed position, and the patterns of FIGS. 6(b), 6(c), and 6(d) are formed at sequentially tighter positions.

Figure 8:
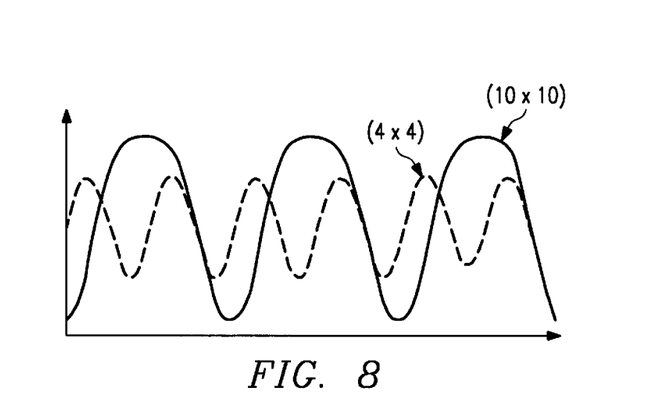
FIG. 8 illustrates the cause of the disparity of effects of environmental fluctuation on output image density.

FIG. 8 illustrates the cause of the disparity and the effect of environmental fluctuation on output image density. In the drawing, the horizontal axis represents the light exposure position, and the vertical axis represents the amount of light. The solid line reflects the light distribution of 10 dot by 10 dot (10×10) pixels shown in FIG. 6(c), and the dashed line reflects the light distribution of four dot by four dot (4×4) pixels shown in FIG. 6(a). In the pixels represented by the dashed line which form a dispersed dot pattern (a dot pattern of large distribution), exposure light easily overlaps due to the narrow dot-to-dot spacing, and the parts of an intermediate exposure state caused by said overlap are relatively plentiful. The parts having intermediate exposure are readily affected by specific changes of the developing device and photosensitive member induced by environmental fluctuation. Accordingly, the output image density changes greatly in conjunction with environmental fluctuation. Relative to this change in output image density, the pixels represented by the solid line which form a tight dot pattern (a dot pattern of small distribution) have few parts having an intermediate exposure state caused by overlap because the dot-to-dot spacing is large. Accordingly, tight dot patterns are not easily affected by environmental fluctuations, and changes in output image density induced by environmental fluctuation are less than that of dispersed dot patterns.

As mentioned above, when selecting a reference pattern sensitive to environmental fluctuation, it is desirable that the dot pattern have larger distribution, i.e., a pattern having an area index of 40–70% is desirable, compared to the dot pattern used for printout.

The image forming apparatus of the present embodiment uses the 150 ppi pattern of FIG. 6(a) as the reference pattern for regulating the developing bias, and uses the 60 ppi data as density toning data. The density toning data includes data expressing a predetermined halftone of the pattern shown in FIG. 6(c).

As can be readily understood from the above discussion, among the pixel patterns of FIGS. 6(a)–6(d), the pattern of FIG. 6(a) is preferred for use in density detection, and the patterns of FIGS. 6(b)–6(d) are preferred for output in accordance with image data.

Figure 9A:
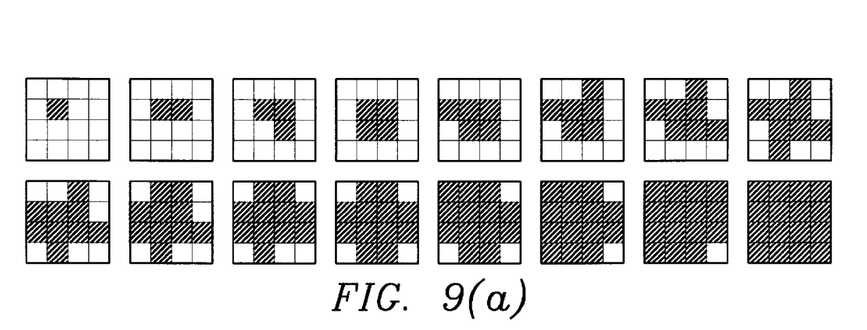
FIGS. 9(a) and 9(b) show examples of halftone reproduction methods having different dot dispersions.
Figure 9B:
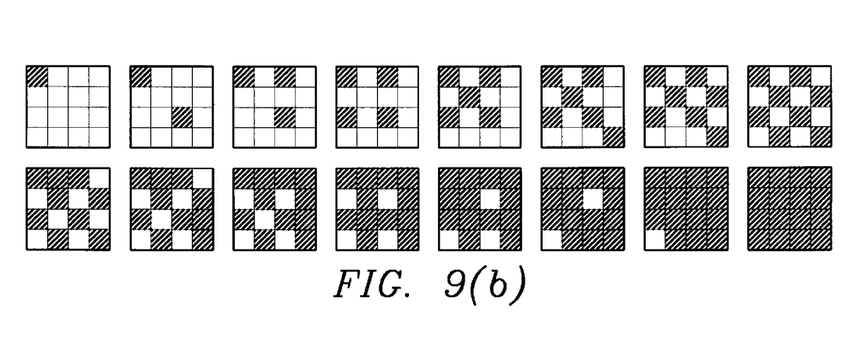
Figure 12:
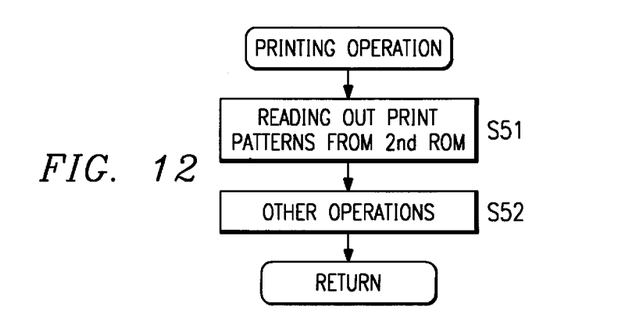
FIG. 12 is a flow chart showing the specific content of the print operation routine of the main routine of FIG. 10.

When the degree of dot distribution differs as in the aforesaid patterns, disparity arises in the effects of environmental fluctuations. Other examples of patterns having different degrees of dot distribution are shown in FIGS. 9(a) and 9(b). The patterns shown in FIG. 9(a) are Fattening type patterns, and the patterns shown in FIG. 9(b) are Bayer type patterns, both types having identical pixel densities. Patterns expressing halftones in Fattening type patterns have a lesser degree of dot distribution compared to Bayer type patterns expressing identical tone levels. That is, Fattening type patterns arrange black dots relatively tightly. Therefore, fattening type patterns do not easily produce intermediate exposure states, and can be said to be patterns which are insensitive to environmental fluctuations compared to Bayer type patterns. Thus, a pattern of predetermined tone levels among the 16 patterns of the Bayer type of FIG. 9(b) is stored in third ROM 29 and used as a reference pattern data for density detection, and the 16 patterns of the Fattening type of FIG. 12(a) are stored in second ROM 27 and used as density toning data for printouts, thereby assuring highly accurate coverage of environmental fluctuations.

Control of the aforesaid image forming apparatus is accomplished by CPU 21. Specific controls are described hereinafter.

Main Routine

Figure 10:
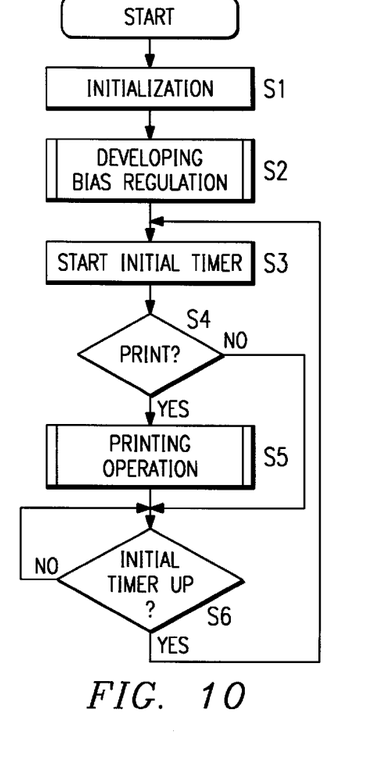
FIG. 10 is a flow chart showing the content of the main routine executed by the CPU in the control section of FIG. 3.

FIG. 10 is a flow chart showing the main routine of controls relating to the operation of the image forming apparatus executed by the control section which includes CPU 21 as shown in FIG. 3.

When the main switch (not illustrated) of the image forming apparatus is turned ON or the reset button (not illustrated) is pressed, the program starts and the apparatus is initialized in step S1. The specific contents of initialization settings include checking the content of first ROM 25, second ROM 27, and third ROM 29, initializing the various flags, and setting the initial value for the developing bias value. In step S2, a process for developing bias regulation is executed. The developing bias regulation process is described in detail later. In step S3, a process for starting the internal timer which stipulate the time of one routine in steps S4–S6 is executed. In step S4, a check is made to determine whether or not a print command has been received from the host computer. When a print command has been received, the printing operation is executed in step S5. The specific content of the printing operation is described in detail later. When a print command has not been received in step S4, however, the routine skips step S5 and advances to step S6. In step S6, the internal timer timeout is awaited, and a process is executed to return to step S3.

Developing bias regulation (step S2)

Figure 11:
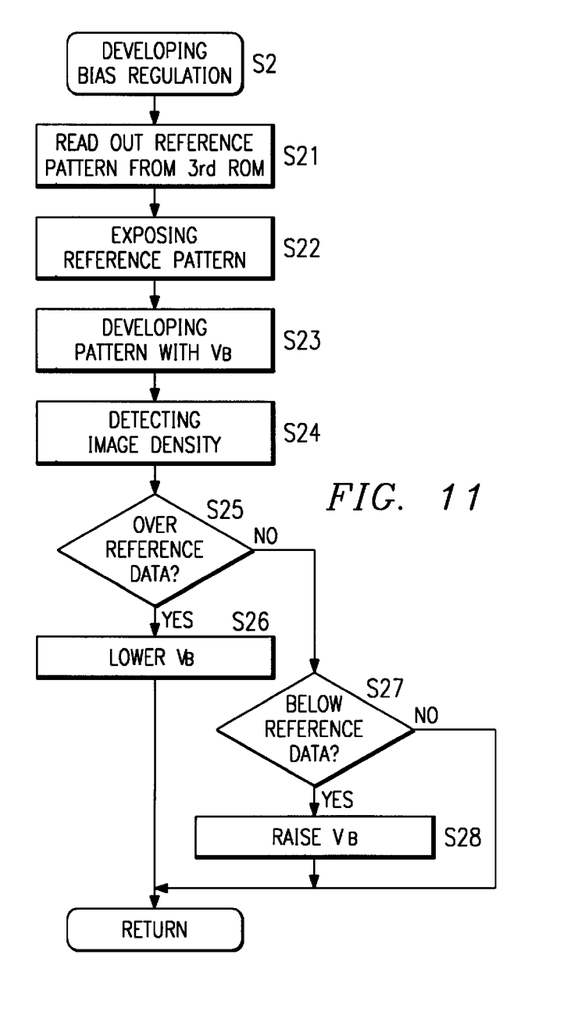
FIG. 11 is a flow chart showing the specific content of the developing bias regulation routine in the main routine of FIG. 10.

FIG. 11 is a flow chart showing the specific content of the developing bias regulation routine of step S2 in FIG. 10. In step S21 of the routine for regulating the developing bias, the reference pattern which is sensitive to environmental fluctuations, i.e., the pattern shown in FIG. 6(a), is read out from third ROM 29 of FIG. 3.

In step S22, a latent image of a dot pattern representing a predetermined tone level is written on photosensitive member 1 by laser light source 5 in accordance with the read out reference pattern data. In step S23, the latent image of the reference pattern data is developed by developing device 7 using the developing bias $V_B$ set in step S1, then in step S24, optical density sensor 9 detects the complete density of the developed reference pattern.

In step S25, the detected density of reference pattern is compared to reference data of a standard density stored in third ROM 29. When the detected density is greater than the standard density, the developing bias $V_B$ is reduced in step S26, and the flow ends.

On the other hand, when the detected density is not greater than the standard density, in step S27, a determination is made as to whether or not the detected density is less than the standard density. When the detected density is less than the standard density, the developing bias $V_B$ is elevated in step S28, and the flow ends. When the detected density is not less than the standard density, i.e., when the detected density data and the standard density data are identical values, the flow ends without adjusting the developing bias $V_B$. The amount of adjustment of the developing bias $V_B$ is determined by referring to a reference table stored in third ROM 29. The reference table contains values set in accordance with the difference between the standard density data and the data of the detected density.

Printing operation (step S5)

FIG. 12 is a flow chart showing the specific content of the printing operation routine of step S5 in FIG. 10. When the printing operation starts, in step S51, the print patterns stored in second ROM 27 of FIG. 3 as density toning data are read out. These print patterns are patterns which are insensitive to environmental fluctuation compared to the reference pattern used for density detection, i.e., they are 60 ppi patterns containing the pattern of FIG. 6(c). In step S52, other operations relating to the printing operation are completed, and the flow ends. These other operations include processes to convert the data to be printed into print patterns, and sequence controls for every device disposed around the periphery of photosensitive member 1.

The aforesaid embodiment has been described in terms of examples of density toning data stored in second ROM 27, reference table and reference pattern data for developing bias regulation stored in third ROM 29, it is to be understood that said data may be stored in a single ROM.

SECOND EMBODIMENT

Figure 13:
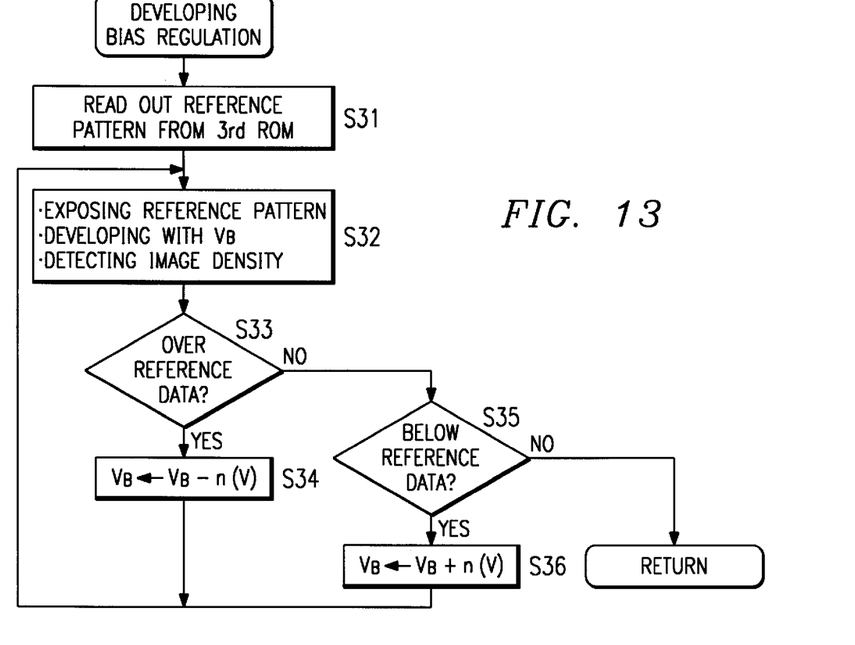
FIG. 13 is a flow chart showing the specific content of the developing bias regulation routine of a second embodiment of the invention.

The second embodiment substitutes the developing bias regulation routine of FIG. 11 with the developing bias regulation routine of FIG. 13.

In the second embodiment, the reference pattern for developing bias regulation is read out from third ROM 29 in step S31. In step S32, the reference pattern is written by laser light source 5, the pattern image is developed by developing device 7, and said developed image is optically read by optical density sensor 9. In steps S33 and S35, the voltage signal representing the density of the reference image output from optical density sensor 9 is compared to a reference data of standard density. When the voltage signal is higher than the reference data, the routine continues to step S34, the value of developing bias $V_B$ is reduced by a value n only, and the routine returns to step S32. When the voltage signal is lower than the reference data, the routine continues to step S36, the value of developing bias $VB$ is elevated by a value n only, and the routine returns to step S32. The processes of steps S32 to S36 are repeated until the detected density is equal to the reference data, whereupon the process of the developing bias regulation routine ends.

According to the second embodiment, a higher degree of precision is possible in regulating the developing bias than is possible in the first embodiment. Furthermore, third ROM 29 may have a smaller capacity because the reference table of the first embodiment is not required.

THIRD EMBODIMENT

Figure 14:
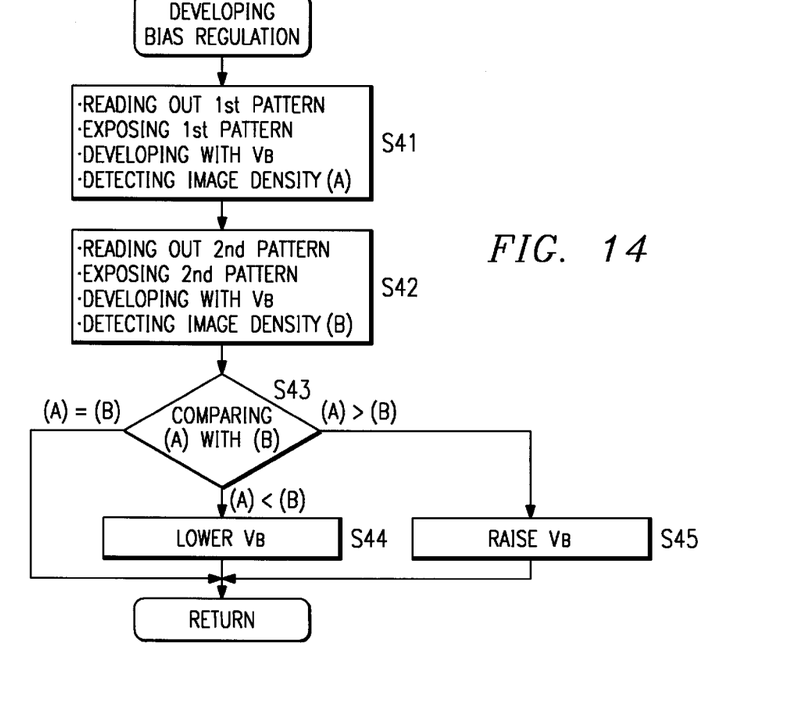
FIG. 14 is a flow chart showing the specific content of the developing bias regulation routine of a third embodiment of the invention.

The third embodiment replaces the developing bias regulation routine of FIG. 11 with the developing bias regulation routine of FIG. 14. In the third embodiment, a pattern insensitive to environmental fluctuations, such as the patterns shown in FIG. 6(d) is used. That is, as previously described in the first embodiment, because the halftone characteristics of such pattern is virtually unaffected by environmental fluctuations, density regulation is accomplished using the output result of the pattern as reference data.

When the developing bias regulation routine is invoked, in step S41, a first reference pattern which is insensitive to environmental fluctuations is read out from second ROM 27, and the latent image formed by an exposure is developed by developing bias $V_B$ set at initialization, and the density (A) of said developed image is optically detected. In step S42, a second reference pattern which is sensitive to environmental fluctuations is read out from third ROM 29. The latent image formed by an exposure is developed, same as that developed for the first reference pattern, and the density (B) of said developed image is detected. The first reference pattern and second reference pattern are shown in FIG. 15.

Figure 15:
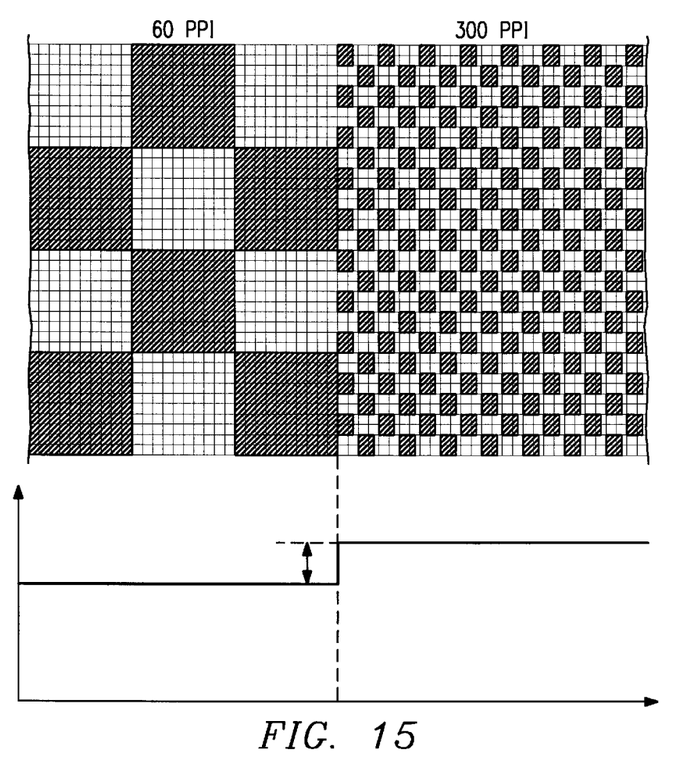
FIG. 15 shows specific examples of a first reference pattern and a second reference pattern of the third embodiment.

FIG. 15 illustrates the latent images of the first reference pattern and second reference pattern formed on the surface of photosensitive member 1, parts represented in black are parts irradiated by laser light). In the drawing, the direction of movement of photosensitive drum 1 is rightward, such that after a first reference pattern comprising a 60 ppi pattern is formed, a second reference pattern comprising a 300 ppi pattern is formed, as described above. Each laser irradiated part of the 300 ppi pattern is reproduced somewhat smaller than each measure, but this is in consideration of the "crushing" of the toner image produced after developing, wherein the "crushing" of the toner after development produces an area index of 50%. Accordingly, although the target output dot area index is invariably the same, the 300 ppi pattern can be said to be relatively sensitive to environmental fluctuations compared to a 60 ppi pattern as previously described. Therefore, developing bias $V_B$ may be regulated using the signal voltage of the 60 ppi pattern output from the optical density sensor 9 as reference data, and using the difference between the signal voltage of the 300 ppi and the signal voltage of the 60 ppi pattern as correction data. Specifically, in step S43, signal voltage (A) of first reference pattern and signal voltage (B) of second reference pattern are compared. When first signal voltage (A) is smaller, the routine advances to step S44 and a process is executed to reduce developing bias voltage $V_B$. On the other hand, when first signal voltage (A) is larger, the routine advances to step S45 and a process is executed to increase developing bias $V_B$.

Essential elements of environmental fluctuations relative to circuits of the optical density sensor and comparator circuits can be eliminated by using reference density data obtained by actually developing patterns on the surface of photosensitive member and detecting the density of same.

FOURTH EMBODIMENT

Figure 16:
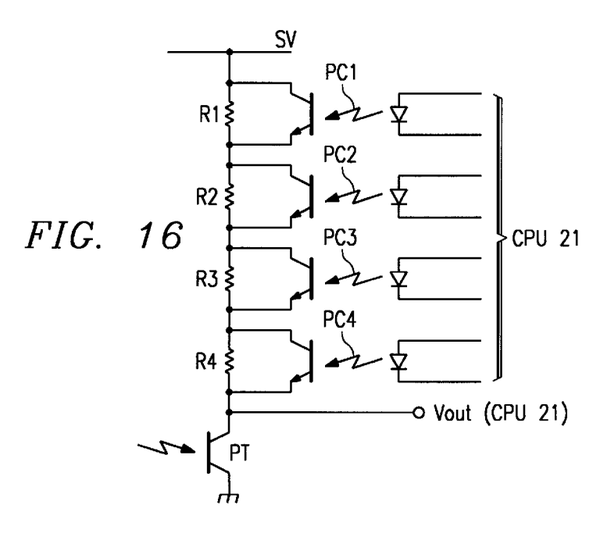
FIG. 16 shows an example of the circuit construction of the photoemitter part of the density sensor control circuit of a fourth embodiment of the invention.

In the third embodiment, essential elements of environmental fluctuations affecting circuits may be accurately eliminated by detecting the density of patterns sensitive to environmental fluctuation after adjusting the density sensor control circuit 37 by adjusting the density detection output value for a pattern insensitive to environmental fluctuation to a constant predetermined value. Such an example is shown in FIG. 16. FIG. 16 shows the circuit construction of the photoreceptor portion of the density sensor control circuit 37 of a fourth embodiment. A plurality of resistors R1–R4 are connected in series to the collector of phototransistor PT used as a photoreceptor element, said resistors R1–R4 being constructed so as to be selectable. Resistors R2–R4 can be selectably shorted or opened via photocouplers PC1–PC3 controlled by CPU 21. First, the detection output $V_{OUT}$ is obtained for density data relative to a pattern insensitive to environmental fluctuations, and resistors R1–R4 are selected so as to adjust said output to a predetermined value. Thereafter, the detection output $V_{OUT}$ is obtained for a pattern which is sensitive to environmental fluctuations.

Figure 17:
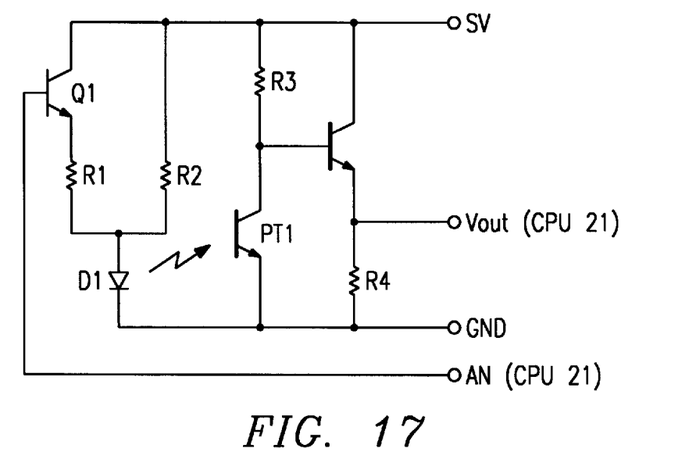
FIG. 17 shows an example of the circuit construction of the photoemitter part of the density sensor control circuit of the fourth embodiment of the invention.

In the example of FIG. 16, detection output is adjusted by circuits of the photoreceptor portion of the density sensor control circuit 37, however, construction allowing adjustment of the amount of light of the photoreceptor portion may also be used. That is, the amount of light emitted by photoemitting diode D1 used as a photoemitter element may be adjusted by controlling the base voltage of transistor Q1 via CPU 21, as shown in FIG. 17.

According to the aforesaid controls, essential elements of environmental fluctuation can be eliminated in the circuits, so as to obtain exceptionally accurate density detection of a reference image.

The construction of the circuits in the fourth embodiment may be adapted to the second embodiment. In this case, an image having an output dot area index of 0% is used as a pattern insensitive to environmental fluctuations instead of density data of a pattern insensitive to environmental fluctuations. Changes in the control circuits induced by fluctuations induced by environment fluctuations can be eliminated by optical density detection of the surface of the photosensitive member on which no toner image is formed.

FIFTH EMBODIMENT

Figure 18:
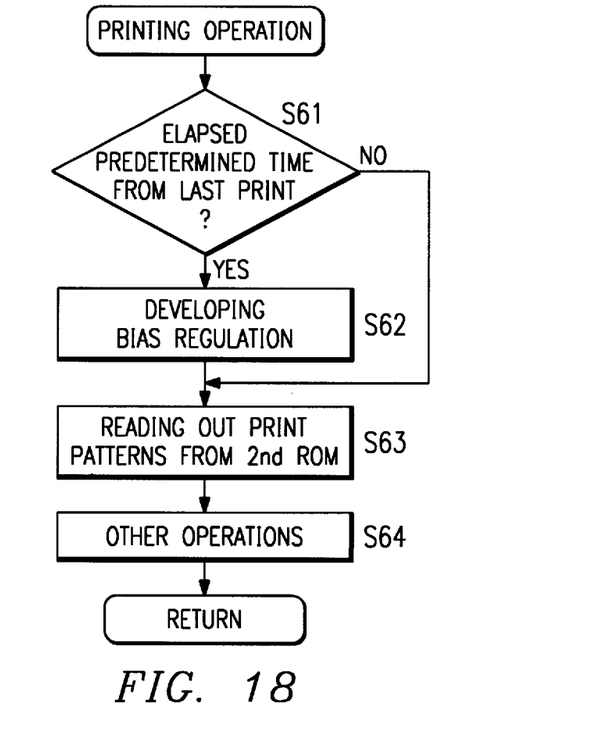
FIG. 18 is a flow chart showing the specific content of the printing operation routine of a fifth embodiment of the invention.

The fifth embodiment adapts the printing operation routine shown in FIG. 18 as the printing operation of the first through fourth embodiments. The printing operation routine of the fifth embodiment executes an actual print operation after adjusting the developing bias when a print command is received after a predetermined time has elapsed following the previous printing. Specifically, in step S61, a determination is made as to whether or not a predetermined time has elapsed since the previous printing. When it is determined that said predetermined time has elapsed, the developing bias is adjusted in step S62, and thereafter a printing operation is executed by steps S63 and S64. Specific contents of the step S62 is same as that of step S2 of the first embodiment. When, however, it is determined in step S61 that said predetermined time has not elapsed, the processes of step S63 and subsequent steps are executed without adjusting the developing bias. The determination of whether or not a predetermined time has elapsed can be accomplished by a timer built into CPU 21. By this means, highly precise density regulation is possible by adjusting the developing bias relative to changes in the operating environment between separate printing operations.

In the present embodiment, developing bias $V_B$ is adjusted to regulate image density, however, alternatively, the intensity of the laser light or charge potential $V_O$ may be adjusted, such adjustments may be accomplished in combination.

Although each of the embodiments has been described in terms of constructions for detecting the density of a toner image formed on a photosensitive member using an optical density sensor, it is to be understood that in an image forming apparatus wherein a toner image formed on the surface of a photosensitive member is first transferred to an intermediate transfer member prior to being transferred to a transfer sheet, the optical density sensor may be constructed so as to detect the density of the image transferred to said intermediate member. Furthermore, the density of the toner image transferred to a transfer sheet and fixed thereon may be detected by an optical density sensor.

The aforesaid embodiments have been described by way examples of image forming apparatus which forms an electrostatic latent image on a uniformly charged photosensitive member via light exposure, but it is to be noted that said image forming apparatus may form an electrostatic latent image directly on a dielectric member having multiple wire electrodes, and develop said latent image with toner.

Although the examples of image forming apparatus in the aforesaid embodiments reproduce images in black, these image forming apparatus may also reproduce color images.

The present invention is not limited to image forming apparatus using an electrophotographic process, and also pertains to image forming apparatus using, for example, ink jet recording methods.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus comprising:
    an image forming mechanism which forms an image having a plurality of regions, in which each region representing a minimum unit for toning, has a size defined by a plurality of dots, and each region having a tone has at least one pigmented dot defining the tone;
    a sensor which detects density of an image formed by said image forming mechanism and outputs a signal in accordance with the density;
    first controlling means for controlling said image forming mechanism to form a first image having regions, each region of the first image having a first arrangement of dots for representing a prescribed tone, and for controlling said sensor to detect a density of the first image and to output a first signal representing the density of the first image;
    second controlling means for adjusting a condition of said image forming mechanism in accordance with the first signal; and
    third controlling means for controlling said image forming mechanism to form a second image in accordance with the condition adjusted by said second controlling means, the second image having regions, each region of the second image having the prescribed tone and a second arrangement of dots, the second arrangement of dots being different than the first arrangement of dots.

2. The image forming apparatus as claimed in claim 1, wherein the density of the first image is more sensitive to fluctuation of environmental conditions of said image forming mechanism than that of the second image.

3. The image forming apparatus as claimed in claim 1, wherein data for the arrangement of dots for each region of the first image is stored in a memory.

4. The image forming apparatus as claimed in claim 1, wherein said second controlling means compares the first signal with reference data and adjusts said condition of said image forming mechanism based on a result of the comparison.

5. The image forming apparatus as claimed in claim 4, wherein said second controlling means repeats the comparison until the first signal conforms to the reference data.

6. The image forming apparatus as claimed in claim 1, wherein the arrangement of dots for each region of the first image has a large distribution and the arrangement of dots for each region of the second image has a small distribution.

7. The image forming apparatus as claimed in claim 1, wherein said image forming mechanism comprises:
    an image carrier;
    a latent image forming device which forms a latent image on the image carrier; and
    a developing device which develops the latent image on said image carrier,
    wherein said sensor detects the density of an image developed by said developing device.

8. The image forming apparatus claimed in claim 7, wherein said condition is a bias voltage between said image carrier and said developing device.

9. The image forming apparatus claimed in claim 1, wherein said first controlling means executes control over said sensor after passing of a predetermined time from an image formation of a previous second image by said image forming mechanism.

10. An image forming apparatus comprising:
    an image forming mechanism which forms an image having a plurality of regions, in which each region, representing a minimum unit for toning, has a size defined by a plurality of dots, and each region having a tone has at least one pigmented dot defining the tone;
    a sensor which detects a density of an image formed by said image forming mechanism; and
    a controller which controls said image forming mechanism to form a first image and a second image, the first image having regions, each of which has a first arrangement of dots, the second image having regions, each of which has a second arrangement of dots, the second arrangement of dots being different from the first arrangement of dots, and further controls said sensor to detect a density of the first image and a density of the second image to compare the detected densities, and controlling said image forming mechanism to adjust a condition of said image forming mechanism in accordance with a result of said comparison.

11. The image forming apparatus as claimed in claim 10, wherein the density of the first image is more sensitive to fluctuation of environmental conditions affecting the image forming mechanism than the density of the second image.

12. The image forming apparatus as claimed in claim 10, wherein the first arrangement of dots has a large distribution and the second arrangement of dots has a small distribution.

13. The image forming apparatus as claimed in claim 10, wherein said image forming mechanism comprises:
    an image carrier;
    a latent image forming device which forms a latent image on the image carrier; and
    a developing device which develops the latent image on the image carrier,
    wherein said sensor detects the density of an image developed by said developing device.

14. The image forming apparatus as claimed in claim 10, further comprising:
    a memory which stores first data of the first arrangement of dots and second data of the second arrangement of dots,
    wherein said image forming mechanism forms the first image and the second image based on the first data and the second data.

15. A method for adjusting a condition of an image forming apparatus which forms an image having a plurality of regions, in which each region, representing a minimum unit for toning, has a size defined by a plurality of dots, and each region having a tone has at least one pigmented dot defining the tone, the method comprising the steps of:
    forming a first image having regions, each region having a first arrangement of dots;
    detecting a density of the first image;
    setting a condition of said image forming mechanism based on the density; and
    forming, pursuant to the condition, a second image having regions, each region having an arrangement of dots, the arrangement of dots of the second image being different than the first arrangement of dots.

16. The method as claimed in claim 15, further comprising the step of:

comparing the detected density of the first image with predetermined data, wherein the condition of the image forming mechanism is set based upon the result of the comparison of the density and the predetermined data.

17. The method as claimed in claim 16, further comprising the steps of:

forming a third image having a plurality of regions, each region having a second arrangement of dots, said second arrangement of dots being different from the first arrangement of dots;

detecting a density of the third image; and comparing the density of the first image with the density of the third image, wherein the setting step sets a condition of said image forming mechanism based on a result of the comparison of the density of the first image with the density of the third image.

18. The method as claimed in claim 15, wherein the setting of the condition of said image forming mechanism is executed after passing a predetermined time from a previous image formation of the second image by the image forming mechanism.

19. The method as claimed in claim 15, wherein the density of said first image is more sensitive to fluctuation of environmental conditions than the second image, as the first arrangement of dots has a large distribution and the second arrangement of dots has a small distribution.

20. An image forming apparatus having an image forming mechanism for forming an image comprised of dots, said image forming apparatus comprising:

a sensor which detects a density of the image formed by said image forming mechanism;

first controlling means for controlling said image forming mechanism to form a first image, said first image having a first pattern of dots;

second controlling means for controlling said sensor to detect a density of said first image;

third controlling means for controlling said image forming mechanism to adjust a condition of said image forming mechanism;

fourth controlling means for controlling said image forming mechanism to form a second image after adjustment of the condition, said second image having a second pattern of dots different from said first pattern of dots; and wherein said first pattern of dots is more sensitive to fluctuation of environmental conditions affecting said image forming mechanism than said second pattern of dots.

21. The image forming apparatus as claimed in claim 20, wherein said first pattern of dots has a large distribution and said second pattern has a small distribution.

* * * * *

UNITED STATES PATENT AND TRADEMARK OFFICE
CERTIFICATE OF CORRECTION

PATENT NO. : 5,835,235
DATED : November 10, 1998
INVENTOR(S) : GOTO, et al.

It is certified that error appears in the above-identified patent and that said Letters Patent is hereby corrected as shown below:

Title page, item [30], Foreign Application Priority Data

After "Sep. 26," delete "1995" and insert --1994--.

Signed and Sealed this

Fourteenth Day of December, 1999

*Attest:*

*Attesting Officer*

Q. TODD DICKINSON

*Acting Commissioner of Patents and Trademarks*